United States Patent [19]

Harnisch

[11] 3,927,005

[45] Dec. 16, 1975

[54] NAPHTHOLACTAM DYESTUFFS

[75] Inventor: Horst Harnisch, Cologne, Germany

[73] Assignee: Bayer Aktiengesellschaft, Leverkusen-Bayerwerk, Germany

[22] Filed: Feb. 27, 1974

[21] Appl. No.: 446,479

[30] Foreign Application Priority Data

Feb. 27, 1973 Germany............................ 2309612
Nov. 17, 1973 Germany............................ 2357442

[52] U.S. Cl. .............. 260/294.8 B; 8/41 B; 8/41 C; 260/37 R; 260/37 N; 260/247.1; 260/247.5; 260/293.57; 260/293.58; 260/304; 260/307 D; 106/193 D
[51] Int. Cl.² ................ C07D 263/56; C07D 277/64
[58] Field of Search ......... 260/304, 294.8 B, 295 T, 260/307 D

[56] References Cited

UNITED STATES PATENTS

| | | | |
|---|---|---|---|
| 2,953,561 | 9/1960 | Doorenbos.......................... | 260/304 |
| 3,090,782 | 5/1963 | Coenen et al....................... | 260/304 |
| 3,399,191 | 8/1968 | Brack................................. | 260/304 |
| 3,539,583 | 11/1970 | Voltz et al. ...................... | 260/307 D |
| 3,649,645 | 3/1972 | Yamada et al..................... | 260/304 |
| 3,691,187 | 9/1972 | Grau................................... | 260/304 |

*Primary Examiner*—R. Gallagher
*Attorney, Agent, or Firm*—Plumley & Tyner

[57] ABSTRACT

This invention relates to naptholactam dyestuffs which contain benzazoles as well as to methods for their preparation. Also disclosed are the manners of using them for dyeing and printing natural and synthetic materials.

3 Claims, No Drawings

NAPHTHOLACTAM DYESTUFFS

The invention relates to naphtholactam dyestuffs of the general formula

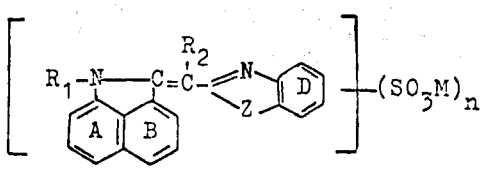

wherein
$R_1$ represents hydrogen, alkyl, alkenyl, cycloalkyl, aralkyl or aryl,
$R_2$ denotes COOM or a halogen-free functionally modified carboxyl group, the

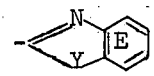

radical or the $-SO_2-R_4$ grouping,
Z represents oxygen or sulfur,
Y represents oxygen, sulfur or $N-R_3$,
$R_3$ represents hydrogen or $C_1-C_4$-alkyl,
$R_4$ represents $C_1-C_4$-alkyl, aryl or aralkyl,
M represents hydrogen or a cation and
n represents the number 0, 1 or 2
and wherein
the cyclic and acyclic radicals can contain further substituents and
the rings D and E can additionally be benzanellated, their preparation and use for dyeing, printing and bulk dyeing of natural and synthetic materials, and the materials dyed and printed with these compounds.

Examples of substituents on the rings A and B are alkyl, alkoxy, halogen, nitro, alkylmercapto, carboxy, alkylsulphonyl, arylsulphonyl, acylamino, nitrile, carbonamide and sulphonamide; alkyl is in particular to be understood as alkyl with 1–4 C atoms, such as methyl, ethyl, isopropyl and n-butyl, alkoxy groups are in particular to be understood as alkoxy groups with 1–4 C atoms, such as methoxy, ethoxy, n-propoxy, n-butoxy and isopropoxy, halogen radicals are to be understood as fluorine and in particular chlorine and bromine, alkylmercapto and alkylsulphonyl are in particular to be understood as alkylmercapto and alkylsulphonyl with 1–4 C atoms in the alkyl radical, such as methyl-, β-hydroxyethyl-, isopropyl- or n-butyl-mercapto or -sulphonyl, arylsulphonyl is in particular to be understood as phenylsulphonyl, aralkylsulphonyl is preferably to be understood as benzylsulphonyl, acylamino is in particular to be understood as $C_1-C_4$-alkylcarbonylamino, such as acetylamino and $C_1-C_4$-alkylsulphonylamino, such as methylsulphonylamino, and carbonamide and sulphonamide radicals are in particular to be understood as carbonamide or sulphonamide radicals optionally substituted by one or two alkyl radicals containing 1 to 4 C atoms, such as methyl, ethyl or n-butyl.

As examples of substituents on rings D and E there may be mentioned: alkyl, alkoxy, halogen, nitrile, cycloalkyl, aralkyl, phenyl, alkylsulphonyl, phenylsulphonyl and sulphonamide; alkyl is in particular to be understood as alkyl with 1–4 C atoms, such as methyl, ethyl, β-cyanoethyl, n-propyl, isopropyl and n-butyl radicals, as well as trifluoromethyl groups, and alkoxy, halogen, alkylsulphonyl and sulphonamide groups are in particular those which have been mentioned as being suitable for rings A and B, whilst cycloalkyl is in particular to be understood as the cyclohexyl radical and aralkyl is in particular to be understood as phenyl-$C_1-C_3$-alkylene radicals.

Alkyl radicals $R_1$ preferably have 1–4 C atoms and are optionally substituted by $C_1-C_4$-alkoxy, chlorine, bromine, nitrile, carboxyl, carb-$C_1-C_4$-alkoxy, sulpho, carbonamide or acetoxy, for example methyl, ethyl, β-cyanoethyl, β-chloroethyl, β-hydroxyethyl, β-hydroxypropyl, β-hydroxy-γ-chloropropyl, β-carboxyethyl, β-carbomethoxy-, -ethoxy- or -butoxyethyl, β-carbonamidoethyl and β-acetoxyethyl. Methyl and ethyl are particularly preferred.

The preferred alkenyl radical $R_1$ to be mentioned is the allyl radical, the preferred cycloalkyl radical to be mentioned is cyclohexyl, preferred aralkyl radicals to be mentioned are benzyl and phenylethyl and the preferred aryl radical to be mentioned is the phenyl radical.

By a halogen-free functionally modified carboxyl group $R_2$ there are in particular to be understood nitrile, carbonamide and carboxylic acid ester radicals.

Carbonamide radicals $R_2$ preferably correspond to the formula $-CO-NR_5R_6$, wherein $R_5$ and $R_6$ each individually represents hydrogen, an optionally substituted alkyl radical, cycloalkyl, aralkyl or aryl, or together with the N atom to which they are bonded, and optionally with the inclusion of further hetero-atoms as ring members, form a 5-membered or 6-membered heterocyclic structure, such as pyrrolidine, piperidine, morpholine and piperazine.

Alkyl radicals $R_5$ or $R_6$ preferably have 1 to 5 C atoms and can be substituted, for example, by $C_1-C_4$-alkoxy, hydroxyl, halogen or nitrile. The cyclohexyl radicals should be mentioned as the preferred cycloalkyl radicals $R_5$ or $R_6$, the benzyl or phenylethyl radical should be mentioned as the preferred aralkyl radical and the phenyl radical, optionally substituted by $C_1-C_4$-alkyl, such as methyl, lower alkoxy such as methoxy, or halogen such as chlorine, should be mentioned as the preferred aryl radical.

Examples of suitable aryl radicals $R_4$ and phenyl radicals substituted by $C_1-C_4$-alkyl, halogen or alkoxy; suitable aralkyl radicals $R_4$ are benzyl and phenethyl.

Possible cations M are those of inorganic or organic bases; possible inorganic cations are in particular alkali metal cations such as Na, K, Li and ammonium, and examples of organic cations are pyridinium, alkylammonium and dialkylammonium, wherein the alkyl groups preferably have 1–4 C atoms, and cations of basic dyestuffs.

As carboxylic acid ester radicals $R_2$ there should in particular be mentioned $C_1-C_5$-alkyl esters of which the alkyl group can also be substituted, for example by $C_1$–$C_4$-alkoxy or CN, and phenyl-$C_1$–$C_3$-alkyl esters such as benzyl and phenylethyl esters.

Preferred naphtholactam dyestuffs correspond to the formula

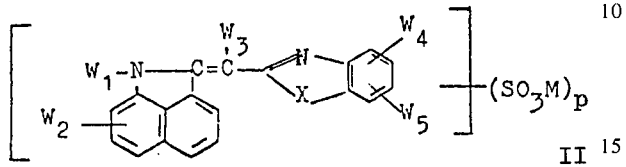

II wherein
$W_1$ represents hydrogen or a $C_1$–$C_4$-alkyl radical,
$W_2$ represents hydrogen, chlorine, bromine, nitro, $C_1$–$C_4$-alkylsulfonyl or one of the $(SO_3M)_p$-groups,
$W_3$ represents $COOW_6$, $CONW_7W_8$, or CN
$W_4$ represents hydrogen, $C_1$–$C_4$-alkyl, methoxy, ethoxy, chlorine, cyclohexyl, benzyl, phenyl or $C_1$–$C_2$-alkylsulfonyl,
$W_5$ represents hydrogen or methyl,
$W_6$ represents $C_1$–$C_4$-alkyl or M,
$W_7$ and $W_8$ represent hydrogen, $C_1$–$C_4$-alkyl or, together with the amide nitrogen a pyrrolidine, piperidine or morpholine ring,
X denotes oxygen or sulphur,
M denotes hydrogen, an alkali metal cation, ammonium or pyridinium and
p denotes 0, 1 or 2.

Compounds of the formula II
in which
$W_1$ represents hydrogen,
$W_2$ represents hydrogen, chlorine, bromine or one of the $SO_3M$-groups and
$W_3$ represents $CONH_2$, COOH or CN
are particularly preferred.

The new dyestuffs of the formula I can be prepared according to various processes.

One of these processes is characterized in that a compound of the formula

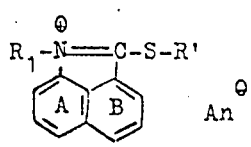

III wherein

R′ represents a $C_1$–$C_4$-alkyl radical, preferably methyl or ethyl,
An represents an anion and
$R_1$, A and B have the abovementioned meaning
is condensed with an azole compound of the formula

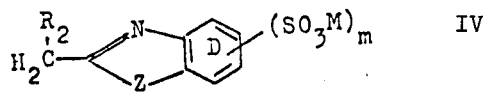

IV wherein
$R_2$, Z, D and M have the abovementioned meaning and
m represents 0 or 1
with elimination of R′—SH and H—An and, the resulting condensation product is sulphonated, brominated, chlorinated and/or saponified, if desired.

A second, particularly preferred process for the preparation of compounds of the formula I is characterised in that a naphtholactam compound of the formula

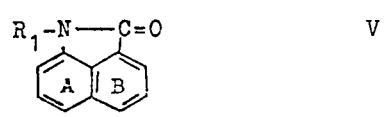

V wherein
$R_1$, A and B have the abovementioned meaning
is reacted with an azole compound of the formula IV in the presence of an acid condensation agent, preferably phosphorus oxychloride, and the condensation product is sulphonated, brominated, chlorinated and/or saponified, if desired.

The condensation of compound III and IV is carried out under alkaline reaction conditions, appropriately in an organic solvent such as methanol, ethanol, butanol, ethylene glycol monomethyl ether, dimethylformamide, pyridine or chlorobenzene, in the presence of an alkaline condensation agent such as triethylamine, potassium carbonate, sodium hydroxide or magnesium oxide, at elevated temperature, appropriately at 40°–160°C, and preferably at 60°–100°C.

The starting products of the formula III are obtainable in a known manner by reaction of a naphtholactam compound of the formula V with diphosphorus pentasulphide to give the corresponding thione compound and its reaction with quaternising agents R-An, preferably dimethyl sulphate (Chem. Abstr. 52, (1958) 11,427; 53 (1959) 9,183; 54 (1960) 10,933, 17,368; 70 (1969) 28,755; Soc. 1960, 1,537). The subsequent sulphonation of compounds of the formula I which are free of sulphonic acid groups is appropriately carried out by reaction with customary sulphonating agents, preferably oleum containing 5–60% of $SO_3$, one to two sulpho groups being introduced. The reaction is appropriately carried out at temperatures between 5° and 50°C, according to methods which are in themselves known.

The condensation of compound V and IV is carried out in the presence of an acid condensation agent such as phosphorus oxychloride, phosphorus oxybromide, phosphorus trichloride, phosphorus tribromide, phosphorus pentachloride, thionyl chloride, phosgene (in an autoclave) or mixtures of phosphorus oxychloride and phosphorus pentoxide. It is appropriately carried out in an inert organic solvent such as benzene, toluene, xylene, chlorobenzene, dichlorobenzene, nitrobenzene, ethylene chloride, carbon tetrachloride or chloroform, at temperatures between 60° and 130°C.

The naphtholactam compounds of the formula V employed as starting products — also for the preparation of compounds of the formula III — are known. As examples there may be mentioned: naphtholactam-(1,8), N-methyl-naphtholactam-(1,8), N-ethyl-naphtholactam-(1,8), N-β-cyanoethyl-naphtholactam-(1,8), N-n-propyl-naphtholactam-(1,8), N-n-butyl-naphtholactam-(1,8), N-β-methoxyethyl-naphtholactam-(1,8), N-β-aminocarbonylethyl-naphtholactam-(1,8), N-β-methoxycarbonylethyl-naphtholactam-(1,8), N-β-hydroxyethyl-naphtholactam-(1,8), N-β-chloroethyl-naphtholactam-(1,8), N-benzylnaphtholactam-(1,8), N-phenyl-naphtholactam-(1,8), 4-methoxynaphtholactam-(1,8), 4-bromo-naphtholactam-(1,8), 4-chloronaphtholactam-(1,8), 2,4-dichloro-naphtholactam-(1,8), 4-nitro-naphtholactam-(1,8), N-ethyl-4-bromo-naphtholactam-(1,8), 4-methylsulphonyl-naphtholactam-(1,8), 4-morpholinosulphonyl-naphtholactam-(1,8), 4-methylmercapto-naphtholactam-(1,8), 4-sulpho-naphtholactam-(1,8) and 2-methyl-naphtholactam-1.8).

The azole compounds of the formula IV employed as starting components are largely known: benzoxazolyl-(2-acetic acid derivatives (formula IV, Z = O) are described in German Offenlegungsschrift (German Published Specification) 2,058,877, in Chem. Ber. 100, 1,432 and 1,661 (1967) and in Journal of Org. Chem. 36 (1971), 2,449 and benzthiazolyl-(2)acetic acid derivatives (formula IV, Z=S) are described in British Patent Specification 829,832 and in Bulletin Soc. Chim. Belg. 57, 360 (1948).

Bis-benzoxazolyl-(2)-methanes are also known from German Offenlegungsschrift (German Published Specification) 2,058,877, from the Journal fur praktische Chemie (4) 20 (1963), 1 and from German Auslegeschrift (German Published Specification) 1,141,530. Analogously thereto, bis-benzthiazolyl-(2)-methanes can be prepared from malonic ester and 2 mols of a o-aminobenzthiazole. Benzoxazolyl-benzimidazolyl-methanes are obtained by warming benzimidazolyl-(2)-acetonitrile for 6 hours with o-aminophenols to 160°–170°C in a high-boiling organic solvent such as glycol, under nitrogen, and benzthiazolyl-benzimidazolyl-methanes are obtained analogously from benzimidazolyl-(2)-acetonitrile and o-aminothiophenols. Benzthiazolyl-benzoxazolyl-methanes are prepared either from benzthiazolyl-acetic acid derivatives and o-aminophenols or benzoxazolyl-acetic acid derivatives and o-aminothiophenols by heating for several hours to temperatures of 160°–190°C in high-boiling organic solvents under nitrogen. Benzoxazolyl- and benzthiazolyl-alkyl-, -aryl- and -aralkyl-sulphonylmethanes are prepared, for example, by reaction of aminophenols and aminothiophenols with the corresponding alkyl-, aryl- and aralkyl-sulphonylacetonitriles. The reaction is optionally carried out in organic solvents at temperatures between 70° and 160°C, preferably 90° and 120°C. Compounds containing sulpho groups of formula IV, are advantageously obtained by sulphonation of the corresponding non-acid compounds under customary conditions, for example with oleum (5–60% SO₃ content) at 10°–40°C.

As examples of suitable compounds of the formula IV there may be mentioned: benzoxazolyl-(2-acetic acid ethyl ester, 5-methyl-benzoxazolyl-(2-acetic acid methyl ester, 4,5-dimethyl-benzoxazolyl-(2-acetic acid n-propyl ester, 5-chloro-benzoxazolyl-(2-acetic acid ethyl ester, 5-bromobenzoxazolyl-(2)-acetic acid methoxyethyl ester, naphth[1,2-d]oxazolyl-(2)-acetic acid ethyl ester, naphth[2,3-d]oxazolyl-(2)-acetic acid methyl ester, 5-ethylsulphonyl-benzoxazolyl-(2)-acetic acid ethyl ester, benzoxazolyl-(2-acetamide, 5-methylbenzoxazolyl-(2)-acetamide, 5-chloro-benzoxazolyl-(2)-acetamide, 5-ethylsulphonyl-benzoxazolyl-(2)-acetamide, 5-dimethylaminosulphonyl-benzoxazolyl-(2)-acetamide, 5-methylbenzoxazolyl-(2-acetic acid methylamide, 4,5-dimethylbenzoxazolyl-(2)-acetic acid methylamide, 5-cyclohexylbenzoxazolyl-(2)-acetic aacid cyclohexylamide, 5-phenylbenzoxazolyl-(2-acetic acid isophorylamide, naphth[1,2-d]oxazolyl-(2-acetic acid methylamide, 5-methoxy-benzoxazolyl-(2)-acetic acid n-propylamide, 5-bromo-benzoxazolyl-(2-acetic acid methylamide, 5-benzyl-benzoxazolyl-(2)-acetic acid methylamide, 5-(1',1',3',3'-tetramethyl-n-butyl)-benzoxazolyl-(2)-acetic acid anilide, 5-phenylsulphonyl-benzoxazolyl-(2)-acetic acid anilide, 5-benzylsulphonyl-benzoxazolyl-(2)-acetic acid methylamide, 5-diethylaminocarbonyl-benzoxazolyl-(2)-acetic acid n-butylamide, 5-methoxy-benzoxazolyl-(2)-acetic acid cyclohexylamide, 5-ethoxy-benzoxazolyl-(2)-acetic acid anilide, 5-phenoxy-benzoxazolyl-(2-acetic acid anilide, 5-acetylamino-benzoxazolyl-(2)-acetic acid 3'-methoxy-n-propylamide, 5-chloro-benzoxazolyl-(2)-acetic acid methylamide, benzoxazolyl-(2)-acetic acid n-propylamide, 5-methylbenzoxazolyl-(2)-acetic acid ethylamide, 5-methyl-benzoxazolyl-(2)-acetic acid n-propylamide, 5-methyl-benzoxazolyl-(2)-acetic acid 2'-hydroxyethylamide, 5-methyl-benzoxazolyl-(2)-acetic acid 3'-methoxy-n-propylamide, 5-methyl-benzoxazolyl-(2)-acetic acid 2'-bromoethylamide, 5-methyl-benzoxazolyl-(2)-acetic acid isobutylamide, 5-methyl-benzoxazolyl-(2)-acetic acid n-hexylamide, 5-methyl-benzoxazolyl-(2)-acetic acid benzylamide, 5-methyl-benzoxazolyl-(2)-acetic acid anilide, 5-methyl-benzoxazolyl-(2)-acetic acid dimethylamide, 5-methylbenzoxazolyl-(2)-acetic acid diethylamide, 5-methyl-benzoxazolyl-(2)-acetic acid di-n-butylamide, 5-methyl-benzoxazolyl-(2)-acetic acid aziridide, 5-methyl-benzoxazolyl-(2)-acetic acid pyrrolidide, 5-methyl-benzoxazolyl-(2)-acetic acid piperidide, 5-methyl-benzoxazolyl-(2)-acetic acid piperazide, 5-methyl-benzoxazolyl-(2)-acetic acid morpholide, benzthiazolyl-(2)-acetic acid ethyl ester, 6-methyl-benzthiazolyl-(2)-acetic acid methyl ester, 6-methoxy-benzthiazolyl-(2)-acetic acid n-propyl ester, 6-ethoxybenzthiazolyl-(2)-acetic acid ethyl ester, 6-chloro-benzthiazolyl-(2)-acetic acid methyl ester, naphth[1,2-d]-thiazolyl-(2)-acetic acid ethyl ester, benzthiazolyl-(2)-acetamide, 6-methyl-benzthiazolyl-(2)-acetic acid methylamide, 6-chloro-benzthiazolyl-(2)-acetic acid ethylamide, 6-methoxy-benzthiazolyl-(2-acetic acid morpholide, 6-ethoxy-benzthiazolyl-(2)-acetic acid dimethylamide, bis-benzoxazolyl-methane, bis-(5-methyl-benzoxazolyl)methane, bis-(5,6-dimethyl-benzoxazolyl)-methane, bis-(5-chlorobenzoxazolyl)-methane, bis-(5-bromobenzoxazolyl)-methane, bis-(5-fluorobenzoxazolyl)-methane, bis-(5-ethylsulphonylbenzoxazolyl)-methane, bis-(5-tertiary butyl benzoxazolyl)-methane, bis-(5-ethyl-benzoxazolyl)-methane, bis-(5-cyclohexyl-benzoxazolyl)-methane, bis-(5-phenyl-benzoxazolyl)-methane, bis-(6-methoxy-benzoxazolyl)-methane, bis-(5-benzylbenzoxazolyl)-methane, bis-(5-dimethylaminosulphonyl-benzoxazolyl)-methane, bis-(5-diethylaminocarbonyl-benzoxazolyl)methane, bis-(5-ethoxy-benzoxazolyl)-methane, bis-(5-phenoxybenzoxazolyl)-methane, bis-(5-acetylamino-benzoxazolyl)-methane, bis-benzthiazolyl-methane, bis-(6-methyl-benzthiazolyl)-methane, bis-(6-methoxy-benzthiazolyl)-methane, bis(6-chloro-benzthiazolyl)-methane, benzimidazolyl-5-methylbenzoxazolyl-methane, benzimidazolyl-benzthiazolyl-methane, benzthiazolyl-5-methyl-benzoxazolyl-methane, 5-methyl-benzimidazolyl-2-benzoxazolyl-methane, 1-methyl-benzimidazolyl-5-phenyl-benzoxazolyl-methane, 1-β-cyanoethyl-benzimidazolyl-5-cyclohexyl-benzoxazolyl-methane, 1-ethyl-benzimidazolyl-5-chloro-benzoxazolyl-methane, 5-methyl-benzoxazolyl-acetamide-6-sulphonic acid, benzthiazolylacetamide-5- or -6-sulphonic acid, bis-(5-methyl- 6-sulphobenzoxazolyl)-methane, 5-methylbenzoxazolyl-phenylsulphonymethane, benzthiazolyl-phenylsulphonylmethane, benzthiazolyl-benzylsulphonylmethane, benzthiazolylmethylsulphonylmethane, benzthiazolyl-(p-methylphenyl)-sulphonylmethane, benzoxazolyl-(p-methylphenyl)sulphonylmethane, benzthiazolyl-(p-chlorophenyl)-sulphonylmethane, benzthiazolyl-(p-methoxy)-sulphonylmethane, benzthiazolyl-(2)-acetamide-6-sulphonic acid, benzoxyzolyl-(2)-acetamide-6-sulphonic acid and benzthiazolyl-(2)-acetonitrile.

The dyestuffs of the formula I give brilliant luminous golden-yellow to red dyeings which in most cases fluoresce in UV light and display outstanding fastness properties in use.

The dyestuffs according to the invention are outstandingly suitable for dyeing oils or macromolecular materials such as lacquers, films, sheets, fibres and mouldings, for example for the bulk dyeing of such articles consisting of cellulose esters such as cellulose 2½-acetate and triacetate, polyvinyl compounds such as polyvinyl chloride and polyvinyl acetate, polyurethanes, polystyrene, polyesters, polyamides and polycarbonates. For this end use it is in particular possible to employ the non-saline compounds of the formula I and such compounds containing sulpho groups which are in the form of salts of suitable organic cations such as, for example, salts of lipophilic alkylamines or basic dyestuffs.

These compounds can also be milled into the said materials together with organic pigments, whereby a substantial improvement in appearance is achieved.

A further preferred field of use of the naphtholactam dyestuffs of the formula I, according to the invention, is the dyeing and printing of natural and synthetic fibre materials and fabrics. Whilst the dyestuffs containing sulpho groups are particularly suitable for dyeing and printing polyamides, silk and fibres and fabrics of polyurethanes and wool, particularly good effects and fastness properties are achieved with the non-saline dyestuffs on polyester fibres and polyester fabrics.

The dyestuffs of the formula I, according to the invention, can be used for dyeing and printing according to customary processes, for example in the form of aqueous solutions, dispersions or printing pastes. The dye baths and printing pastes can contain the customary dyeing auxiliary additives such as levelling agents, dispersing agents and dyeing accelerators, for example substituted polyglycol ethers, condensation products of aromatic sulphonic acids and formaldehyde, condensation products of higher-molecular amines and ethylene oxide, higher-molecular alkyl sulphates and alkylsulphonates in the form of their aqueous sodium salts or cyclohexylamine salts, condensation products of higher-molecular alcohols and ethylene oxide, cellulose sulphite waste liquor products, o-hydroxydiphenyl, halogenated aromatic hydrocarbons and/or esters of aromatic carboxylic acids.

The dyestuffs of the formula I, according to the invention, can also be used for dyeing from organic solutions, for example from solutions in which water-immiscible solvents such as tetrachloroethylene, trichloroethylene, 1,2,2-trichloroethane or 1,1,1-trichloropropane are used.

EXAMPLE 1

20 G of naphtholactam-(1,8) and 21 g of benzoxazolyl-(2)-acetamide in 120 ml of anhydrous chlorobenzene are treated dropwise, at 100°C, with 30 g of phosphorus oxychloride and the mixture is warmed to 110°C for 2 hours. After cooling, the crystalline precipitate is filtered off, washed successively with toluene, methanol, sodium acetate solution and water, recrystallized from about 380 ml of dimethylformamide, washed with methanol and dried in vacuo at 80°C. 32 g of the compound of the formula (1) 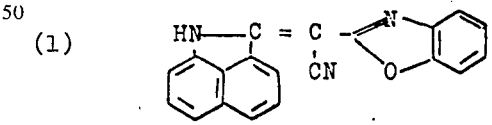

are obtained.

When used to dye polyester fibres, the dyestuff (1) displays a luminous red-yellow colour shade having good fastness properties. The dyestuff is distinguished by excellent build-up and affinity. The dyestuffs listed in the table which follows are obtained analogously using appropriate starting materials:

Table

Dyestuffs of the formula

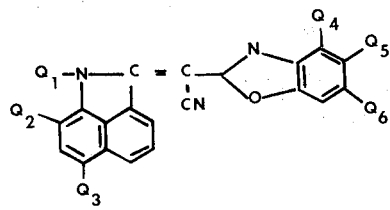

| Dye-stuff No. | $Q_1$ | $Q_2$ | $Q_3$ | $Q_4$ | $Q_5$ | $Q_6$ | Colour shade on polyester |
|---|---|---|---|---|---|---|---|
| (2) | H | H | Br | H | $CH_3$ | H | yellow-orange |
| (3) | H | Cl | Cl | H | ⟨H⟩ | H | yellow-orange |
| (4) | H | H | Cl | H | ⟨⟩ | H | orange |
| (5) | $CH_3$ | H | H | H | Cl | H | orange |
| (6) | H | $C_2H_5$ | H | H | H | H | yellow-orange |
| (7) | $C_2H_5$ | H | H | H | H | H | orange |
| (8) | N≡C—$CH_2$—$CH_2$— | H | H | H | $CH_3$ | $CH_3$ | clear orange |
| (9) | ⟨⟩-$CH_2$ | H | H | H | $CH_3$ | H | orange |
| (10) | H | H | $OCH_3$ | H | H | H | red-orange |
| (11) | H | H | $NO_2$ | H | $CH_3$ | $SO_3H$ | orange (polyamide) |
| (12) | H | H | H | —CH=CH—CH=CH— | | H | reddish-tinged orange |

EXAMPLE 2

20 G of naphtholactam-(1,8) and 25 g of 5-methyl-benzoxazolyl-(2)-N-methyl-acetamide in 120 ml of anhydrous chlorobenzene are treated dropwise, at 95°C, with 19 g of phosphorus oxychloride and the mixture is stirred for 3 hours at 95°–100°. After cooling, the crystalline precipitate is filtered off, washed successively with toluene, methanol, sodium acetate solution and water and dried in vacuo at 80°C. 74 g of a dyestuff which in the main corresponds to the formula

(13) 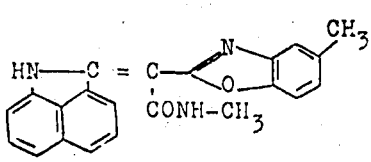

are obtained. When used to dye polyester fibres, the dyestuff shows a luminous red-yellow colour shade with good fastness properties and very good build-up and affinity.

The dyestuffs listed in the table which follows are obtained analogously using appropriate starting materials:

Table

Dyestuffs of the formula

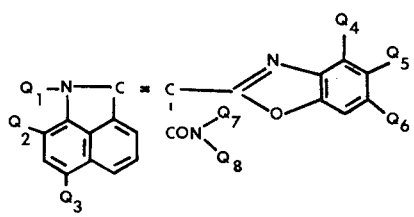

| Dyestuff No. | $Q_1$ | $Q_2$ | $Q_3$ | $Q_4$ | $Q_5$ | $Q_6$ | $Q_7$ | $Q_8$ | Colour shade (polyester) |
|---|---|---|---|---|---|---|---|---|---|
| (14) | $C_2H_5$ | H | H | H | $CH_3$ | H | H | $CH_3$ | luminous yellow-orange |
| (15) | H | H | H | H | phenyl | H | H | $C_2H_5$ | orange |
| (16) | H | H | H | H | cyclohexyl | H | $C_2H_5$ | $C_2H_5$ | yellow-orange |
| (17) | H | H | H | H | $\begin{array}{c}N(CH_3)_2\\SO_2\end{array}$ | H | H | $CH_3$ | clear orange |
| (18) | H | H | H | H | Cl | H | \multicolumn{2}{|c|}{$-(CH_2)_4-$} | orange |
| (19) | H | H | H | H | $CH_3$ | $CH_3$ | H | $CH_3$ | luminous orange |
| (20) | H | H | H | \multicolumn{2}{|c|}{$-CH=CH-CH=CH-$} | H | $CH_3$ | $CH_3$ | red-orange |
| (21) | H | H | H | H | $OCH_3$ | H | H | $CH_2$-phenyl | red-orange |
| (22) | H | $C_2H_5$ | H | H | H | H | \multicolumn{2}{|c|}{$-(CH_2)_2-O-(CH_2)_2-$} | red-yellow |
| (23) | $CH_3$ | H | H | H | $CH_3$ | H | H | $-(CH_2)_3OCH_3$ | orange |
| (24) | H | H | Br | H | H | H | \multicolumn{2}{|c|}{$-(CH_2)_5-$} | orange |
| (25) | $C_2H_5$ | H | $SO_3H$ | H | H | H | H | $CH_3$ | orange (polyamide) |

EXAMPLE 3

20 G of naphtholactam-(1,8) and 32.8 g of bis-[5-methyl-benzoxazolyl-(2)]-methane in 160 ml of anhydrous chlorobenzene are treated dropwise, at 100°C, with 19 g of phosphorus oxychloride and the mixture is warmed for 2 hours to 105°–110°C and cooled. After standing for 12 hours, the crystalline precipitate is filtered off, washed with toluene and then with petroleum ether, and dried. The crystals are stirred with 10% strength sodium acetate solution for 30 minutes, filtered off, washed with water and recrystallised from approx. 1 liter of dimethylformamide. 37 G of dyestuff of the formula

(26) 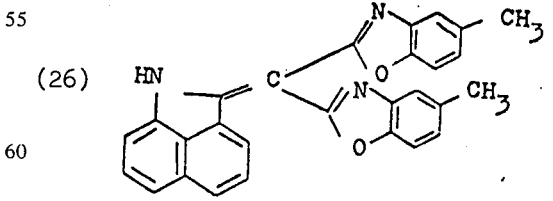

are obtained; the dyestuff dissolves in dimethylformamide to give an intense yellow-red colour.

The dyestuffs listed in the table which follows are obtained analogously using appropriate starting materials:

Table

Dyestuffs of the formula

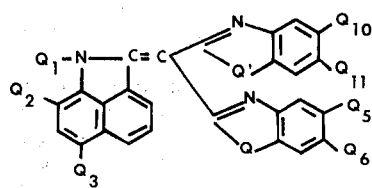

| Dyestuff No. | $Q_1$ | $Q_2$ | $Q_3$ | $Q_5$ | $Q_6$ | $Q_{10}$ | $Q_{11}$ | Q | Q' | Colour shade of the solution in DMF |
|---|---|---|---|---|---|---|---|---|---|---|
| (27) | H | H | Br | H | H | H | H | O | O | yellow-red |
| (28) | H | H | H | $CH_3$ | H | $CH_3$ | H | O | NH | yellowish-tinged red |
| (29) | H | H | H | H | H | H | H | S | S | red |
| (30) | H | H | H | H | H | H | H | NH | red | |
| (31) | $CH_3$ | H | H | $SO_2C_2H_5$ | H | $SO_2C_2H_5$ | H | O | O | red |
| (32) | $C_2H_5$ | H | H | $CH_3$ | $CH_3$ | H | H | O | S | red |
| (33) | H | $C_2H_5$ | H | $CH_3$ | H | $CH_3$ | H | O | O | yellow-red |
| (34) | H | H | H | $C_6H_5$ | H | $C_6H_5$ | H | O | O | luminous red |

EXAMPLE 4

20 G of naphtholactam-(1,8) and 35 g of 5-ethylsulphonylbenzoxazolyl-(2)-acetic acid ethyl ester in 140 ml of anhydrous chlorobenzene are treated dropwise, at 95°C, with 18.5 g of phosphorus oxychloride and the mixture is stirred for 3 hours at 95°–100°C. After standing for 12 hours, the crystalline precipitate is filtered off, washed successively with toluene, methanol, sodium acetate solution, water and ethanol and dried in vacuo at 60°C. 22 g of a dyestuff of the formula (35)

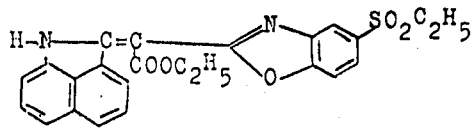

are obtained. When used to dye polyester fibres, the dyestuff (35) shows a yellow-orange-coloured shade of good fastness properties.

The dyestuffs listed in the table which follows are obtained analogously using appropriate starting materials.

Table

Dyestuffs of the formula

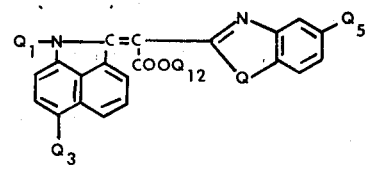

| Dyestuff No. | $Q_1$ | $Q_3$ | $Q_5$ | Q | $Q_{12}$ | Colour shade (polyester) |
|---|---|---|---|---|---|---|
| (36) | H | H | $CH_3$ | O | $CH_3$ | yellow-red |
| (37) | H | Br | H | O | $C_2H_5$ | orange |
| (38) | $CH_3$ | H | H | O | $C_2H_4OCH_3$ | orange |
| (39) | H | H | $N(CH_3)_2$ $SO_2-$ | O | $C_2H_5$ | orange |
| (40) | H | H | H | S | $C_2H_5$ | reddish-tinged orange |

EXAMPLE 5

20 G of naphtholactam-(1,8) and 34.5 g of benzthiazolyl-(2)-phenylsulphonylmethane in 200 ml of anhydrous chlorobenzene are treated dropwise, at 85°C, with 20 g of phosphorus oxychloride and the mixture is stirred for 1 hour at this temperature and cooled. The crystalline precipitate is filtered off, washed with toluene, dried, stirred, in a finely powdered form, with 200 ml of methanol, filtered off, washed with methanol and dried in vacuo at 60°C. Yield 33.5 g. The product is purified by recrystallisation from ethylene glycol monomethyl ether. The dyestuff has the formula

(41) 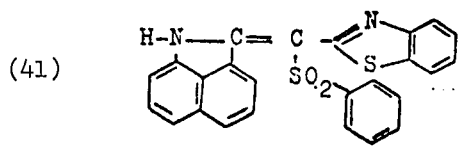

On polyester material, the dyestuff (41) shows a red-orange-coloured shade having good fastness properties. The dyestuffs listed in the table which follows are obtained analogously using appropriate starting materials.

EXAMPLE 6

20 G of naphtholactam and 24 g of benzthiazolyl-(2)-acetamide in 240 ml of anhydrous chlorobenzene are treated dropwise, at 90°–95°C, with 36 g of phosphorus oxychloride and the mixture is stirred for 6 hours at 90°–95°C. After cooling, the crystalline precipitate is filtered off, washed with toluene, stirred with 240 ml of ethanol for 15 minutes, filtered off, washed with ethanol, recrystallised from 180 ml of dimethylformamide and dried in vacuo at 80°C. 29 g of dyestuff which corresponds to the formula

(48) 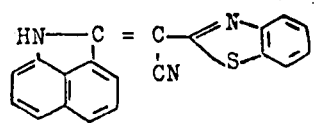

Table

Dyestuffs of the formula

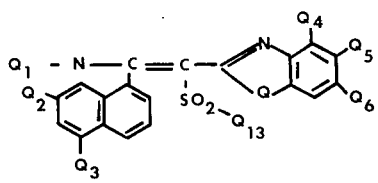

| Dyestuff No. | $Q_1$ | $Q_2$ | $Q_3$ | $Q_4$ | $Q_5$ | $Q_6$ | $Q$ | $Q_{13}$ | Colour shade (polyester) |
|---|---|---|---|---|---|---|---|---|---|
| (42) | H | H | H | H | H | H | S | $CH_3$ | red-orange |
| (43) | H | H | H | —CH=CH—CH=CH— | | H | O | $C_6H_5$ | luminous red |
| (44) | H | H | Br | H | $CH_3$ | H | O | —C<sub>6</sub>H<sub>4</sub>—CH$_3$ | yellowish-tinged red |
| (45) | H | H | H | H | H | H | S | —CH$_2$—C$_6$H$_5$ | yellow-red |
| (46) | H | $C_2H_5$ | H | H | H | H | S | —C$_6$H$_4$—Cl | yellowish-tinged red |
| (47) | $C_2H_5$ | H | O$_3$H | H | $CH_3$ | H | O | —C$_6$H$_5$ | red-orange (polyamide) |

Benzthiazolyl-(2)-phenylsulphonylmethane is prepared as follows: 90 g of phenylsulphonyl-acetonitrile in 100 ml of ethylene glycol are warmed with 68 g of o-aminothiophenol under nitrogen to 95°–100°C for 1 hour, during which ammonia is evolved. After cooling to 60°C, 150 ml of ethanol are added. The mixture is heated to the boil and is cooled to 15°C. The crystalline precipitate is filtered off, washed with ethanol and dried in vacuo at 50°C. Yield: 86 g.

and gives a luminous orange-coloured shade, with very good fastness properties, on polyester, are obtained.

The same dyestuff (48) is obtained if instead of benzthiazolyl-(2)-acetamide 23 g of benzthiazolyl-(2)-acetonitrile is employed.

The dyestuffs listed in the table which follows are obtained analogously using appropriate starting materials:

Table

Dyestuffs of the formula

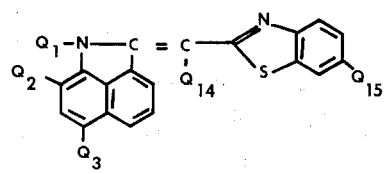

| Dyestuff No. | $Q_1$ | $Q_2$ | $Q_3$ | $Q_{14}$ | $Q_{15}$ | Colour shade (polyester) |
|---|---|---|---|---|---|---|
| (49) | H | H | H | CN | $OC_2H_5$ | red-orange |
| (50) | H | H | H | —CO—NHCH$_3$ | H | luminous orange |
| (51) | CH$_3$ | H | Br | —CO—N(morpholino) | H | reddish-tinged orange |
| (52) | H | H | H | CN | OCH$_3$ | red-orange |
| (53) | H | Cl | Cl | —COOCH$_3$ | H | orange |
| (54) | CH$_3$ | H | H | COCH$_3$ | H | yellow-orange |
| (55) | H | H | —SCH$_3$ | —COOC$_2$H$_5$ | H | red-orange |
| (56) | H | H | SO$_2$CH$_3$ | —CN | H | reddish-tinged orange |
| (57) | H | H | H | —CN | SO$_3$H | clear orange |
| (58) | C$_2$H$_5$ | H | Br | —CON(cyclohexyl) | H | orange |
| (59) | H | C$_2$H$_5$ | H | —CONH—CH$_2$—C$_6$H$_5$ | CH$_3$ | orange |
| (60) | H | H | SO$_3$H | —CONH—CH$_3$ | H | orange (polyamide) |
| (61) | H | H | NO$_2$ | —CON(CH$_3$)$_2$ | H | reddish-tinged orange |

EXAMPLE 7

19.4 G of 1-cyanoethyl-2-methylmercapto-benz[c.d-]indolium methosulphate (C.A. 70 (1969) 28,755) and 9.6 g of benzthiazolyl-(2)-acetamide in 130 ml of n-propanol are heated to the boil with 5.5 g of triethylamine for 4 hours, during which methylmercaptan is evolved. After cooling, the crystalline precipitate is filtered off, washed with ethanol and dried in vacuo at 50°C. 18 g of dyestuff of the formula

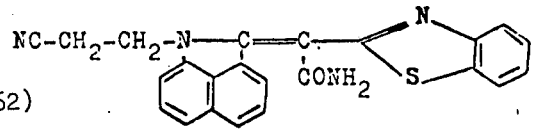

(62)

are obtained. On polyester fibres, the dyestuff shows a red-orange-coloured shade having good fastness properties. The dyestuffs listed in the table which follows are prepared analogously using appropriate starting materials:

Table

Dyestuffs of the formula

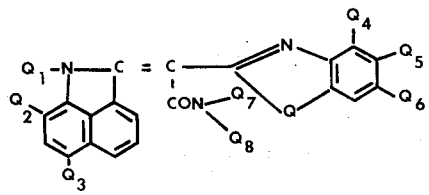

| Dyestuff No. | $Q_1$ | $Q_2$ | $Q_3$ | $Q_4$ | $Q_5$ | $Q_6$ | $Q_7$ | $Q_8$ | Q | Colour shade (polyester) |
|---|---|---|---|---|---|---|---|---|---|---|
| (63) | CH$_3$ | H | H | H | C$_6$H$_5$ | H | H | | CH$_3$ | O | reddish-tinged orange |
| (64) | C$_2$H$_5$ | H | Br | H | CH$_3$ | CH$_3$ | —(CH$_2$)$_4$— | | | O | yellow-orange |
| (65) | H$_2$NCO—C$_2$H$_4$ | H | H | H | H | H | C$_2$H$_5$ | | C$_2$H$_5$ | S | red-orange |

Table-continued

Dyestuffs of the formula

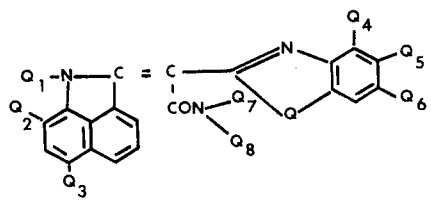

| Dyestuff No. | $Q_1$ | $Q_2$ | $Q_3$ | $Q_4$ | $Q_5$ | $Q_6$ | $Q_7$ | $Q_8$ | Q | Colour shade (polyester) |
|---|---|---|---|---|---|---|---|---|---|---|
| (66) | HO—$C_2H_4$ | H | H | H | H | H | (—$CH_2$)$_2$ | O($CH_2$)$_2$ | O | yellow-orange |
| (67) | $CH_3OCO$—$C_2H_4$ | H | H | H | Cl | H | $CH_2C_6H_5$ | H | O | orange |
| (68) | $NaO_3S$—$C_2H_4$ | Cl | Cl | —(CH=$CH_2$)$_2$— | H | $CH_3$ | $CH_3$ | O | reddish-tinged orange (polyamide) |

EXAMPLE 8

10 G of dyestuff of the formula 1 (Example 1) are introduced into 100 g of 10% strength oleum at 5°–10° and the mixture is stirred for 2 hours at room temperature. The reaction mixture is poured out onto 300 g of ice and 20 g of potassium chloride and the whole is stirred. The crystalline precipitate of the dyestuff-acid of the formula

(69) 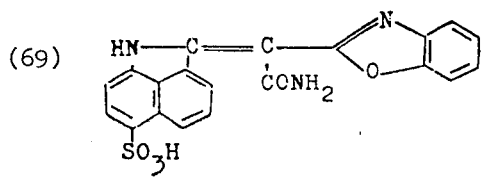

is filtered off, washed with sodium chloride solution and dried. 14 G of orange-brown powder which dyes polyamide or wool in a luminous red-yellow are obtained.

The water-soluble sodium salt of the dyestuff (69) is prepared by neutralisation with sodium hydroxide solution and salting out with sodium chloride solution.

The dyestuffs listed in the table which follows are obtained analogously using appropriate starting materials:

Table

Dyestuffs of the formula

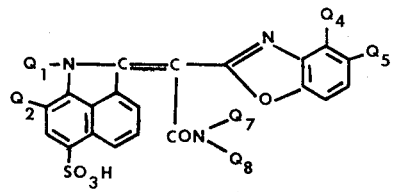

| Dyestuff No. | $Q_1$ | $Q_2$ | $Q_4$ | $Q_5$ | $Q_7$ | $Q_8$ | Colour shade (polyamide) |
|---|---|---|---|---|---|---|---|
| (70) | H | H | H | $CH_3$ | H | $CH_3$ | luminous yellow-orange |
| (71) | H | H | H | ⟨phenyl⟩ | H | H | red-orange |
| (72) (73) | $CH_3$ | H | H | Cl | H | H | yellow-orange |
| (74) | H | Cl | H | H | H | H | yellow-red |
| (75) | H | H | —CH=CH—CH=CH— | | $CH_3$ | $CH_3$ | red-orange |
| (76) | H | $H_2N$—CO | H | $OCH_3$ | H | H | orange |
| (77) | —$CH_2$—$CH_2$ | H | H | $CH_3$ | H | H | yellow-orange |
| (78) | $HO_3S$ | H | H | $CH_3$ | —$CH_2$—$CH_2$—O—$CH_2$—$CH_2$— | | yellow-orange |
| (79) | —$CH_2$—$CH_2$ H | H | H | $CH_3$ | H | —($CH_2$)$_3OCH_3$ | luminous red-yellow |
| (80) | H | $C_2H_5$ | H | H | H | H | clear orange-yellow |

EXAMPLE 9

If the procedure described in Example 8 is followed but instead of compound (13) the same amount of the dyestuff of the formula (36) is employed, the dyestuff of the formula

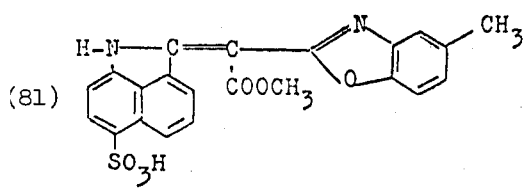
(81)

is obtained. It dyes polyamide in yellow-orange-coloured clear shades having good fastness properties. If instead of compound (13) the same amount of the dyestuff of the formula (40) is employed, the dyestuff of the formula

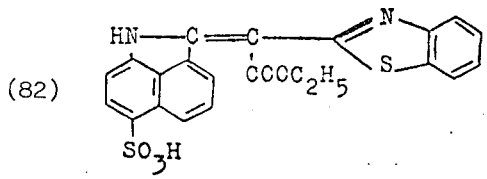
(82)

is obtained, which dyes polyamide fibres in luminous red-orange-coloured shades having very good fastness properties.

EXAMPLE 10

10 g of dyestuff of the formula (26) (Example 3) are introduced into 100 g of 15% strength oleum at 5°–10°C, the mixture is stirred for 2 hours at room temperature and poured out into 1.2 liters of ice water and the product is filtered off, and largely dissolved in 450 ml of water, with addition of 50% strength NaOH until pH 12 is reached, whilst warming to 60°C; the solution is filtered and the product is salted out with sodium chloride solution. The dyestuff of the formula

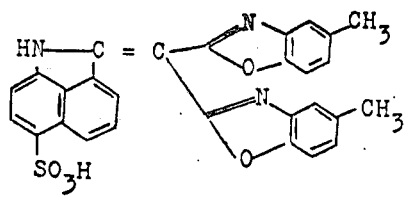
(83)

is filtered off, washed with 2% strength sodium chloride solution and dried in vacuo at 60°. It dissolves in dimethylformamide to give a deep violet colour. When used to dye polyamide fibres, the dyestuff (83) shows a yellowish-tinged red colour shade with good fastness properties.

If instead of the dyestuff of the formula (26) a dyestuff of the formula (27), (28), (29), (39), (32), (33) or (34) is employed, red, water-soluble dyestuffs having similarly good properties on polyamide are obtained.

EXAMPLE 11

10 G of dyestuff of the formula (48) (Example 6) are introduced into 100 g of 10% strength oleum at 5°–10°C and . . . 2 hours at room temperature. The reaction mixture is worked up in accordance with the instructions of Example 8 and 15 g of dyestuff-acid of the formula

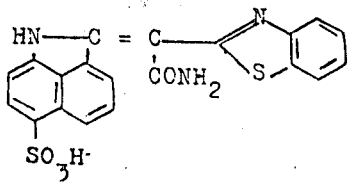
(84)

are obtained as an orange-brown powder which dyes polyamide and wool in a luminous yellow-red. The same dyestuff (84) is obtained if instead of compound (48), compound (103) is employed. Neutralisation with sodium hydroxide solution and salting out with sodium chloride solution gives the sodium salt of the dyestuff (84).

The dyestuffs listed in the table which follows are obtained analogously, using appropriate starting materials:

Table

Dyestuffs of the formula

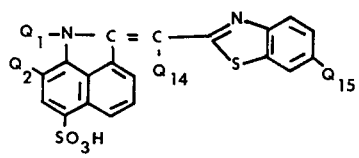

| Dyestuff No. | $Q_1$ | $Q_2$ | $Q_{14}$ | $Q_{15}$ | Colour shade (polyamide) |
|---|---|---|---|---|---|
| (85) | H | H | —CONH—$CH_3$ | H | luminous orange |
| (86) | H | H | —CO—N⟨O⟩ (morpholino) | H | reddish-tinged orange |
| (87) | H | H | —$CONH_2$ | $OCH_3$ | red-orange |
| (88) | H | Cl | —$COOCH_3$ | H | orange |
| (89) | $CH_3$ | H | —$CONH_2$ | H | yellow-orange |
| (90) | H | H | —$CONH_2$ | H | reddish-tinged orange |
| (91) | H | H | —$CONH_2$ | $OC_2H_5$ | orange-red |
| (92) | —$CH_2$—$CH_2$—$SO_3H$ | H | —$CONH_2$ | H | orange |
| (93) | H | $C_2H_5$ | —$CONH_2$ | $CH_3$ | yellow-orange |
| (94) | H | H | —$COCH_3$ | H | orange |
| (95) | H | H | —CON($CH_3$)$_2$ | H | reddish-tinged orange |
| (96) | O=C—$NH_2$, $CH_2$—$CH_2$— | H | —$CONH_2$ | H | yellow-orange |
| (97) | Cl—$CH_2$—$CH_2$ | H | —CON⟨pyrrolidino⟩ | H | orange |
| (98) | H | H | —$SO_2$—$CH_3$ | H | reddish-tinged orange |
| (99) | H | H | —$SO_2$—C$_6$H$_5$ | H | clear red-orange |
| (100) | H | H | —$SO_2$—C$_6$H$_4$—$CH_3$ | H | red-orange |
| (101) | H | H | —$SO_2$—$CH_2$—C$_6$H$_5$ | H | reddish-tinged orange |
| (102) | H | $C_2H_5$ | —$SO_2$—C$_6$H$_4$—Cl | H | orange |

EXAMPLE 12

An approximately 0.4% strength dyeing with dyestuff (1) on polyethylene terephthalate fabric was produced as follows:

The fabric is introduced, using a liquor ratio of 1:40, into a dye bath at 50°C which contains the finely divided dyestuff, 2 g/l of a conventional anionic dispersing agent, 5 g/l of o-cresotic acid methyl ester and 1 g/l of $NaH_2PO_4$ and is adjusted to pH 4.5–5 with acetic acid. The temperature is raised to 80°–85°C over the course of 15 to 20 minutes and this temperature range is maintained for a further 20 minutes. The liquor is then gradually brought to the boil. After boiling for 1–1.5 hours, the dyeing process is complete.

After rinsing and drying, a luminous red-yellow dyeing having good fastness properties is obtained.

If instead of (1), one of the other dyestuffs of Example 1 or one of the non-acid dyestuffs listed in Examples 2, 4, 5, 6 or 7 is employed, polyester dyeings having similarly valuable properties are obtained.

EXAMPLE 13

30 G of the disperse dyestuff of the formula (48) are dissolved in a mixture of 50 g of thiodiglycol, 20 g of printing oil and 160 ml of water. The mixture is diluted with 200 ml of water and thickened with 400 g of crystal gum, and a printable paste is produced with a further 60 to 100 ml of water. This paste is used to print polyethylene terephthalate fabrics in the usual manner, and the fabrics are then steamed in a steamer at 103°–105°C for 20 minutes. After soaping, rinsing with water and drying, a clear orange-coloured print is obtained, which is distinguished by good fastness properties.

EXAMPLE 14

Polyethylene terephthalate fabric is impregnated on a padder, at 40°, with an aqueous liquor which contains, per liter, 10 g of finely disperse dyestuff of the formula (56), 7.5 g of sodium alginate, 20 g of triethanolamine and 20 g of octylphenyl polyglycol ether. The fabric is squeezed out to a liquor content of 60%, dried at 100°C and then fixed for 30 seconds at 200°–210°C. After rinsing and drying, a luminous orange-coloured dyeing having good fastness properties is obtained.

EXAMPLE 15

A polyethylene terephthalate fabric is impregnated at room temperature with a padding liquor which contains 5.5 g of dyestuff of the formula (6) in 994.5 g of tetrachloroethylene. After squeezing out to a weight increase of 60%, the fabric is dried for 1 minute at 80°C. The dyestuff is then fixed for 45 seconds at 220°C. The fabric is subsequently washed for 20 seconds with cold tetrachloroethylene. After drying, an orange-coloured dyeing having good fastness properties is obtained.

EXAMPLE 16

0.06 G of the dyestuff of the formula (84) in the form of the sodium salt, 0.5 g of ammonium acetate (anhydrous) and 1 g of sodium sulphate are dissolved, with warming, in 500 ml of water. 10 g of a fabric of synthetic polyamide are introduced at 50°C. The temperature of the dye bath is raised to 100°C over the course of 30 minutes and is kept at this temperature for 1 hour, 0.3 g of acetic acid being added after 30 minutes. After rinsing and drying, a brilliant red-orange dyeing having very good fastness properties is obtained.

If instead of compound (84) (Na salt), the alkali metal salt or ammonium salt of one of the remaining dyestuffs listed in Example 11 or in Examples 8, 9, 10, 23 or 24 is employed, polyamide dyeings with similarly valuable properties are obtained.

EXAMPLE 17

0.06 G of the dyestuff (28) which has been sulphonated in accordance with the procedure of Example 10, 0.3 g of 30% strength acetic acid, 0.5 g of anhydrous ammonium acetate, 1 g of sodium sulphate and 0.1 g of a commercially available levelling agent are dissolved in 500 ml of water, with warming. 10 g of a woollen fabric are introduced at 40°C. The temperature of the dye bath is raised to 100°Over the course of 45 minutes and is kept at this temperature for 1 hour. After rinsing and drying, a clear yellowish-tinged red dyeing having good fastness properties is obtained.

EXAMPLE 18

10 G of dyestuff of the formula (48) (Example 6) are stirred for 20 hours at room temperature with 120 g of 90% strength sulphuric acid, the mixture is poured out into 2 l of ice water and the product is filtered off, washed first with water and then with 5% strength sodium acetate solution and finally again with water. After drying in vacuo at 60°C, 9.5 g of the dyestuff of the formula

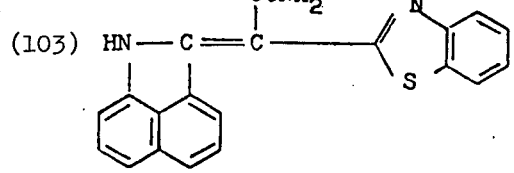

are obtained; when used to dye polyester fibres, the dyestuff shows a luminous red-yellow colour shade having good fastness properties.

If instead of dyestuff (48) the same amount of dyestuff of the formula (1) is employed, 9.2 g of dyestuff of the formula (104)

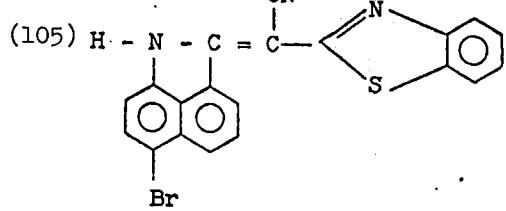

are obtained; on polyester, the dyestuff shows a luminous reddish-tinged yellow colour shade having good fastness properties.

EXAMPLE 19

9.8 G of dyestuff of the formula (48) (Example 6) are suspended in 100 ml of carbon tetrachloride, treated with 5.6 g of bromine at 18°–20°C whilst stirring, and stirred for 10 hours at room temperature. The precipitate is filtered off, washed with carbon tetrachloride, recrystallised from 200 ml of dimethylformamide, washed with methanol and dried in vacuo at 50°C. 9.4 G of the compound of the formula (105)

are obtained as an orange-red powder; the compound dyes polyester in a luminous orange-coloured shade having very good fastness properties.

If instead of compound (48) an equivalent amount of dyestuff of the formula (1) is employed, the compound of the formula (106) 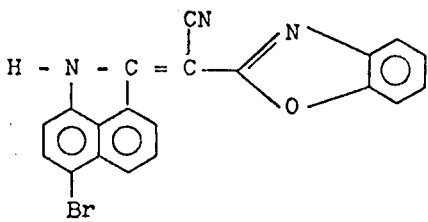

is obtained analogously. It dyes polyester in a luminous yellow-orange-coloured shade having very good fastness properties.

EXAMPLE 20

6.5 G of compound of the formula (48) (Example 6) are suspended in 80 ml of carbon tetrachloride, 3 g of sulphuryl chloride are added dropwise at 20°–25°C and the mixture is stirred for 15 hours at room temperature. The crystalline precipitate is filtered off, washed with carbon tetrachloride, recrystallised from about 80 ml of dimethylformamide, washed with methanol and dried in vacuo at 60°C. 4 g of the dyestuff of the formula (107) 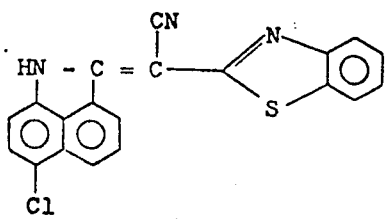

are obtained. It dyes polyester in a luminous orange-coloured shade having very good fastness properties.

If instead of compound (48) an equivalent amount of dyestuff of the formula (1) is employed, the compound of the formula (108) 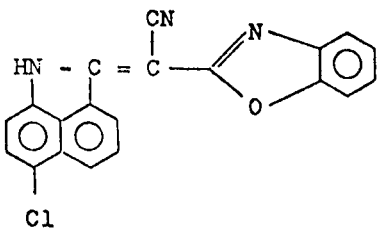

is obtained analogously. It dyes polyester in a luminous yellow-orange-coloured shade having very good fastness properties.

EXAMPLE 21

7 G of 6-bromo-N-ethyl-naphtholactam and 5 g of benzthiazolyl-(2)-acetamide are suspended in 50 ml of anhydrous chlorobenzene and 7.7 g of phosphorus oxychloride are added whilst stirring. The mixture is stirred at 100°C for 15 minutes. The solvent is then stripped off in vacuo, the residue is stirred with 50 ml of 10% strength sodium bicarbonate solution for 10 minutes at 95°C, the aqueous phase is decanted and the residue is recrystallised from 120 ml of ethylene glycol monomethyl ether. 5.2 G of compound of the formula (109) 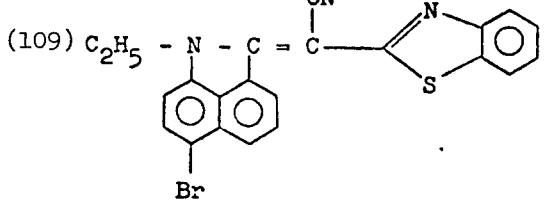

are obtained. The compound dyes polyester in a luminous slightly bluish-tinged red shade having good fastness properties.

If instead of benzthiazolyl-(2)-acetamide an equivalent amount of benzoxazolyl-(2)-acetamide is employed, the compound of the formula (110) 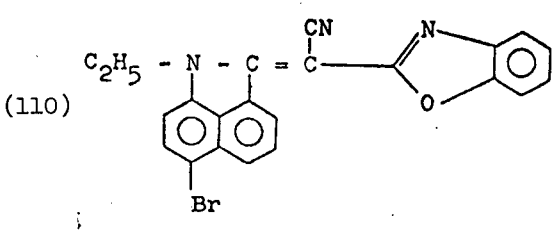

is obtained analogously. It dyes polyester in a luminous orange-coloured shade having good fastness properties.

EXAMPLE 22

12.5 G of compound of the formula (48) (Example 6) are introduced into a mixture of 62.5 g of sulphuric acid and 93.5 g of 20% strength oleum whilst stirring, the mixture is warmed to 60°C for 6 hours and poured out onto 400 g of ice, the whole is stirred and the dyestuff is salted out with 20 g of potassium chloride, filtered off and dried in vacuo at 60°C. 21 g of dyestuff of the formula (111) 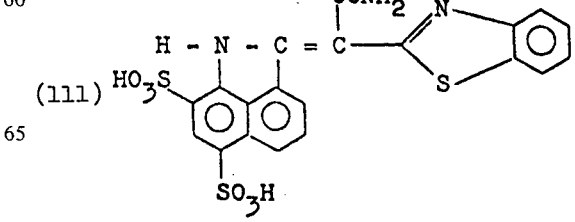

are obtained. The dyestuff dyes polyamide in luminous orange-coloured shades.

EXAMPLE 23

10 G of the dyestuff of the formula (84) (Example 11) are heated to the boil in 200 ml of a 10% strength hydrochloric acid for three hours while stirring and cooled. The crystalline precipitate is filtered by suction and dried in vacuo at 60°C. 8.5 g of dyestuff of the formula (112)

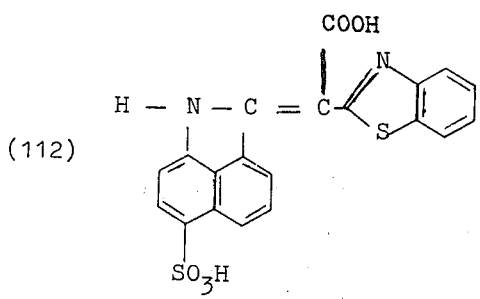

are obtained as an orange crystal-powder; the dyestuff dyes polyamide or wool in a luminous orange-coloured shade having very good fastness properties.

By neutralization with 5% strength potassium hydroxide and salting out with potassium chloride the water-soluble potassium salt of the dyestuff (112) is obtained.

If instead of compound (84) the compound of the formula (69) (Example 8) is employed, the compound of the formula.

(113)

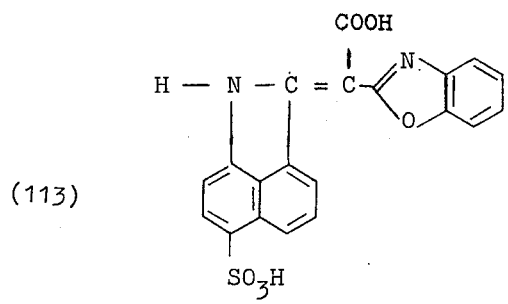

is obtained analogously. It dyes polyamide in a luminous orange-coloured shade having good fastness properties.

EXAMPLE 24

10 G of the dyestuff of the formula (84) (Example 11) are heated to the boil under stirring and reflux in 200 ml 10% strength formaldehyde solution for 4 hours whereby the dyestuff dissolves. After cooling the crystalline precipitate is filtered off by suction, washed with little water and dried in vacuo at 60°C. 10 g of the dyestuff of the formula (114)

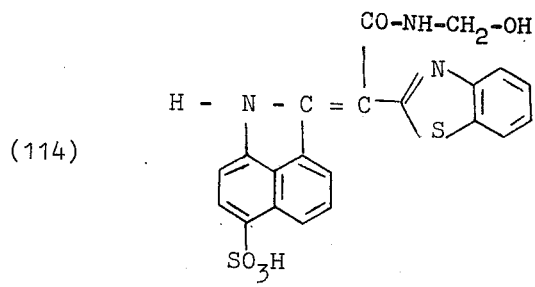

are obtained as an orange-coloured crystal powder which dyes polyamide or wool in a luminous red-orange coloured shade with very good fastness properties.

If instead of compound (84) the compound of the formula (69) (Example 8) is employed, the dyestuff of the formula (115)

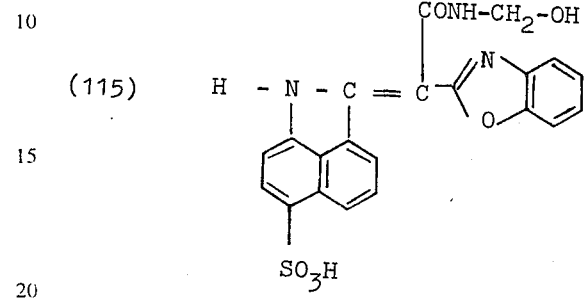

is obtained analogously. It dyes polyamide or wool in a luminous orange-coloured shade having good fastness properties.

I claim:
1. Naphtholactam dyestuffs of the formula

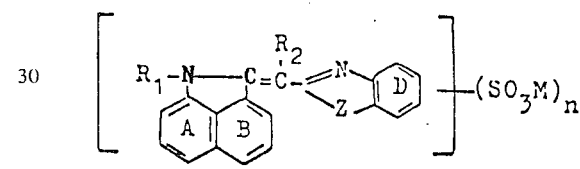

wherein
$R_1$ = hydrogen, $C_1$–$C_4$-alkyl, allyl, cyclohexyl, benzyl, phenethyl, phenyl, or $C_1$–$C_4$-alkyl substituted by $C_1$–$C_4$-alkoxy, chloro, bromo, cyano, carboxyl, carbo-$C_1$–$C_4$-alkoxy, sulfo; carbonamido, or acetoxy;

$R_2$ = COOM, CN, $CONH_2$, $COOR_7$, $SO_2R_4$, or

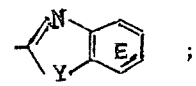 ;

$R_4$ = $C_1$–$C_4$-alkyl, benzyl, phenethyl, or phenyl substituted by $C_1$–$C_4$-alkyl, halogen or $C_1$–$C_4$-alkoxy;
$R_7$ = $C_1$–$C_5$-alkyl, phenyl-$C_1$–$C_3$-alkyl, or $C_1$–$C_5$-alkyl substituted by $C_1$–$C_4$-alkoxy or cyano;
M = H, alkali metal cation, ammonium, $C_1$–$C_4$-monoalkylammonium, $C_1$–$C_4$-dialkylammonium, or pyridinium;
Z = —O— or —S—;
Y = —O—, —S—, or

$R_3$ = hydrogen or $C_1$–$C_4$-alkyl;
n = 0, 1, or 2;
A and B are as shown in the above formula or additionally are substituted by $C_1$–$C_4$-alkyl, $C_1$–$C_4$-alkoxy, halogen, nitro, $C_1$–$C_4$-alkylmercapto, carboxy, $C_1$–$C_4$-alkylsulfonyl, phenylsulfonyl, $C_1$–$C_4$-alkylcarbonylamino, $C_1$–$C_4$-alkylsulfonylamino, carbonamido, sulfonamido, or either of carbonamido or sulfonamido monosubstituted or disubstituted by $C_1$–$C_4$-alkyl; and D and E are as shown in the above formulas or additionally are substituted by a fused benzene ring, $C_1$–$C_4$-alkyl, cyanoethyl, trifluoromethyl, $C_1$–$C_4$-alkoxy, halogen, cyano, cyclohexyl, phenyl-$C_1$–$C_3$-alkyl, phenyl, $C_1$–$C_4$-alkylsulfonyl, phenylsulfonyl, sulfonamido, or sulfonamido monosubstituted or disubstituted by $C_1$–$C_4$-alkyl.

2. Naphtholactam dyestuff of the formula

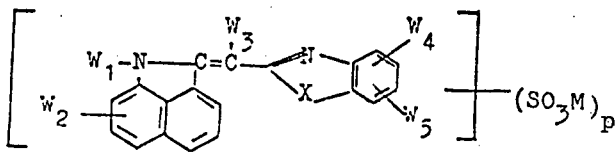

wherein
$W_1$ represents hydrogen or a $C_1$–$C_4$-alkyl radical,
$W_2$ represents hydrogen, chlorine, bromine, nitro, $C_1$–$C_4$-alkylsulfonyl or one of the $SO_3M$-groups,
$W_3$ represents $COOW_6$, $CONH_2$, or $CN$
$W_4$ represents hydrogen, $C_1$–$C_4$-alkyl, methoxy, ethoxy, chlorine, cyclohexyl, benzyl, phenyl or $C_1$–$C_2$-alkylsulfonyl,
$W_5$ represents hydrogen or methyl,
$W_6$ represents $C_1$–$C_4$-alkyl or M,
X denotes oxygen or sulphur,
M denotes hydrogen, an alkali metal cation, ammonium or pyridinium and
p denotes 0, 1 or 2.

3. Naphtholactam dyestuffs according to claim 2, wherein
$W_1$ represents hydrogen,
$W_2$ represents hydrogen, chlorine, bromine or one of the $SO_3M$-groups and
$W_3$ represents $CONH_2$, $COOH$ or $CN$.

* * * * *